Dec. 28, 1926.

J. HOLLAND-LETZ 1,612,437

GRINDING BURR

Filed April 21, 1922

INVENTOR
John Holland-Letz
By John Howard Mellor
HIS ATTY.

Patented Dec. 28, 1926.

1,612,437

UNITED STATES PATENT OFFICE.

JOHN HOLLAND-LETZ, OF CROWN POINT, INDIANA, ASSIGNOR TO THE LETZ MANUFACTURING COMPANY, OF CROWN POINT, INDIANA, A CORPORATION OF INDIANA.

GRINDING BURR.

Application filed April 21, 1922. Serial No. 555,306.

My invention is concerned with grinding burrs for use in general purpose mills, and is designed to produce a burr that will be somewhat more efficient than those I have heretofore employed.

In carrying out my invention, I employ a novel design for and arrangement of the cutting teeth whereby the material to be ground is sufficiently and certainly ground, and at the same time passed as rapidly from the center to the periphery of the burrs as is consistent with the employment of low speed burrs not depending for their feeding action upon the centrifugal action due to the speed at which the burrs are rotated.

Figure 1:
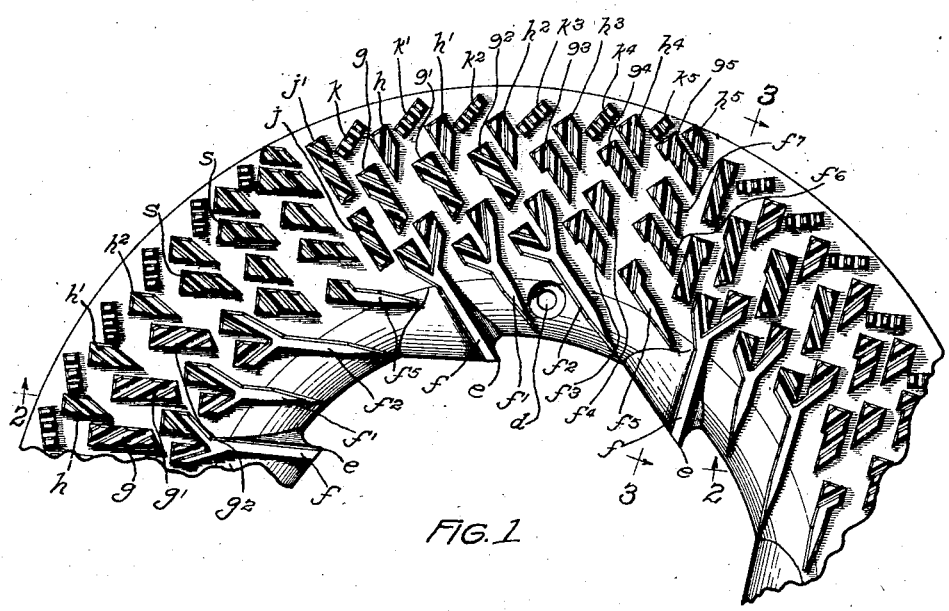
Figure 2:
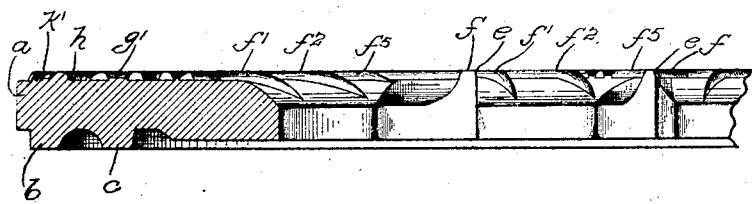
Figure 3:
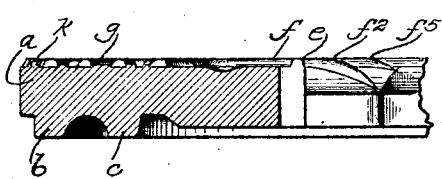

To illustrate my invention, I annex hereto a sheet of drawings, in which the same reference characters are used to designate identical parts in all the figures, of which, Fig. 1 is a plan view of a portion of the burr embodying my invention; and Figs. 2 and 3 are sections on the lines 2—2 and 3—3, respectively, of Fig. 1.

In carrying out my invention, I employ the customary annular base $a$, preferably provided with the annular flanges $b$ and $c$ on the back and the necessary holes $d$ for securing the burrs to their supports.

As is customary, the face of the burr may be considered as made up of a plurality of, preferably six, similar sections, of which two complete and two fractional sections are shown. The boundaries of each section may be considered as consisting of lines drawn through the points $e$ of the tearing teeth $f$ and parallel (for the adjacent teeth) to the section line 3—3. The teeth $f$, as well as the similar but shorter teeth $f'$ and $f^2$, have their bases somewhat Y-shaped, as shown, and in continued alignment therewith are the teeth $g$, $g'$ and $g^2$ having the generally quadrilateral shaped bases. Parallel to but extending at one side of the teeth $g$, $g'$ and $g^2$ are the teeth $h$, $h'$ and $h^2$, likewise having generally quadrilateral bases, but generally shorter and with the single acute angle somewhat sharper than the corresponding acute angle of the teeth $g$, $g'$ and $g^2$. The two teeth $j$ and $j'$ to the left, beyond and parallel to the teeth $f$ and $g$, have substantially rectangular bases. The three teeth $f^3$, $f^4$ and $f^5$ taken as a group resemble in their outline the teeth $f$, $f'$ and $f^2$, while the teeth $f^6$ and $f^7$ correspond to the teeth $f^2$ and $f^4$. The teeth $g^3$, $g^4$ and $g^5$ form a continuation of the same, as do the teeth $h^3$, $h^4$ and $h^5$ of that series. Outside of all, the series of teeth $k$, $k'$, $k^2$, $k^3$, $k^4$ and $k^5$, having rectangular bases, are placed across the series of channels formed by the other teeth to prevent the premature escape of the unground material.

It will be noted that all the teeth described have all or a portion of the surfaces grooved to a depth approaching, but not equal to the general surface of the burr, the channels in some of the teeth inclining to the left as shown, while those in the rest of them incline to the right, and those in the teeth $f$, $f'$ and $f^2$ have forked ends with grooves extending both ways. The teeth $k$, $k'$, etc., have grooves extending directly across them. Some of the teeth, such as $j$, $j'$, $f^3$, $g^4$, etc., have the shoulders $s$ thereon so located as to act on the end of long pieces and control their movement through the mill.

It will be understood that after these burrs are cast, they have their upper surfaces ground off slightly in a common plane so that the tops of all the teeth are made flat with cutting edges. With the shape and relative location of the teeth shown, the material to be ground, entering between the pair of burrs at the center, while it tends to be thrown outward by the centrifugal action of the rotating burr, does not depend upon this action, as its teeth are so shaped as to oppose the centrifugal action to some extent, and further to furnish inclined abutments to elevate the uncut grain or material up to a point where it will be sheared by the passing teeth before it can flow outward to the periphery.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. A low-speed grinding burr comprising a disk having an annular base portion composed in its operative surface design of a plurality of similar sections, each section comprising plural series of teeth arising therefrom above the plane of the base and covering substantially the entire surface of the base so that there are only narrow passages between adjacent teeth, said teeth being provided with channels extending therethrough and having their tops ground off flat in a single plane to form a plurality of shearing edges, the axes of substantially all the teeth of each section extending in a generally parallel arrangement throughout the entire section.

2. A low-speed grinding burr comprising a disk having an annular base portion composed in its operative surface design of a plurality of similar sections, each section comprising plural series of teeth arising therefrom above the plane of the base, said teeth being provided with channels extending therethrough and having their tops ground off flat in a single plane to form a plurality of shearing edges, the axes of substantially all the teeth of each section extending in a generally parallel arrangement throughout the entire section, the channels in a certain area of each section extending substantially radially while those in the remaining area of the section extend substantially parallel to the periphery.

3. A low-speed grinding burr comprising a disk having an annular base portion composed in its operative surface design of a plurality of similar sections, each section comprising plural series of teeth arising therefrom above the plane of the base and covering substantially the entire surface of the base so that there are only narrow passages between adjacent teeth, said teeth being provided with channels extending therethrough and having their tops ground off flat in a single plane to form a plurality of shearing edges, the axes of the teeth extending at an angle to both the intersecting radii and the periphery.

4. A low-speed grinding burr comprising a disk having an annular base portion composed in its operative surface design of a plurality of similar sections, each section comprising plural series of teeth arising therefrom above the plane of the base, said teeth being provided with channels extending therethrough and having their tops ground off flat in a single plane to form a plurality of shearing edges, the axes of the teeth extending at an angle to both the intersecting radii and the periphery and the channels in a certain area of each section extending substantially radially while those in the remaining area of the section extend substantially parallel to the periphery.

5. A burr comprising a disk having an annular base portion composed in its operative surface design of a plurality of similar sections, each section comprising plural series of teeth arising therefrom above the plane of the base; said teeth being provided with channels extending therethrough and having their tops ground off flat in a single plane to form a plurality of shearing edges, the axes of substantially all the teeth of each section extending in a generally parallel arrangement throughout the entire section, some of the inner teeth being substantially Y-shaped with the channels extending through the branches.

6. A burr comprising an integral disk having an annular base portion with plural series of elongated teeth arising therefrom above the plane of the base and formed integrally therewith, said teeth extending at an angle to both the intersecting radii and periphery, some of said teeth having offsets forming re-entrant angles opening toward the center, and all of them being provided with channels extending diagonally therethrough, and having their tops ground off flat in a single plane to form a plurality of shearing edges.

In witness whereof, I have hereunto set my hand this 18th day of April, 1922.

JOHN HOLLAND-LETZ.